United States Patent [19]

Hervig et al.

[11] 4,381,424
[45] Apr. 26, 1983

[54] MULTI-CORE CABLE CONNECTION FOR MEDIUM VOLTAGE CABLE

[75] Inventors: Harold C. Hervig, Maplewood, Minn.; Dieter Kehr; Raymond Krabs, both of Hamburg, Fed. Rep. of Germany

[73] Assignee: Minnesota Mining and Manufacturing Company, Saint Paul, Minn.

[21] Appl. No.: 258,421

[22] Filed: Apr. 28, 1981

[30] Foreign Application Priority Data

Apr. 30, 1980 [DE] Fed. Rep. of Germany ....... 3016585

[51] Int. Cl.³ .......................................... H02G 15/184
[52] U.S. Cl. ................................ 174/73 R; 174/88 R
[58] Field of Search .............. 174/73 R, 73 SC, 88 R, 174/88 C, 91; 339/60 R

[56] References Cited

U.S. PATENT DOCUMENTS 3,485,935 12/1969 Kreuger .................... 174/73 R X
4,074,926 2/1978 Broad ......................... 174/73 R X Primary Examiner—Laramie E. Askin
Attorney, Agent, or Firm—Cruzan Alexander; Donald M. Sell; Terryl K. Qualey

[57] ABSTRACT

A multi-core cable connection for medium voltage cables in which each core connection includes a pair of prefabricated permanently elastic stress control elements, each of which has a sleeve-like main body of insulating material and a conductive sleeve-like insert in the body, extending out of one end thereof and bridging the core insulation and the conductor connector.

8 Claims, 3 Drawing Figures

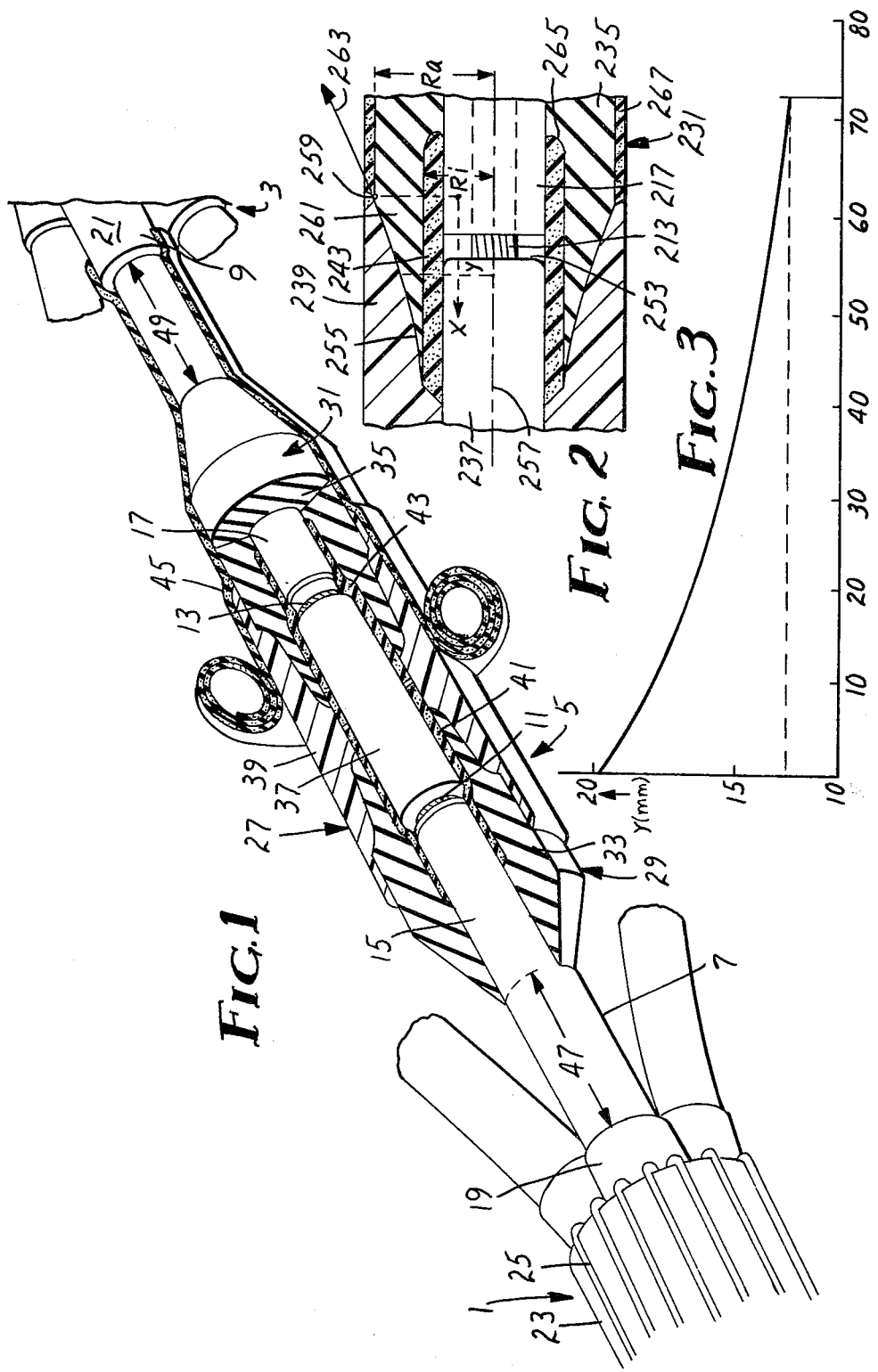

MULTI-CORE CABLE CONNECTION FOR MEDIUM VOLTAGE CABLE

TECHNICAL FIELD

The invention relates to a multi-core cable connection for medium voltage cables, in which each core connection is surrounded by a stress controlling envelope at either end extending a distance along the core insulation and closely contacting it.

BACKGROUND ART

With multi-core cable, core connections have been made in practice, for example, by offsetting or penciling the core insulations, applying the core connector, wrapping with high voltage insulation tapes, applying an electrically conductive outer shielding, and filling the splice case or enclosure with insulating material. The wrapping of the insulating tapes has to be performed with care while keeping to relatively close dimensional tolerances to obtain the desired stress control. With single core cable connections, this does not normally cause any particular difficulties. With multi-core cable connections, however, when wrapping the insulation tape, the other cores must be worked around. Relatively long end portions of the cores have to be exposed to permit spreading the cores apart far enough to permit the winding to be performed with the necessary accuracy. But often, in cable manholes, there is little cable length available to make the connection; in that case only relatively short end portions of the cores may be exposed, and the winding is very difficult, and often inaccurate.

There are other types of core connections known in which the stress control shielding consists of a prefabricated sleeve-like elastomeric body which, similar to the above-described outer splice case, may be kept in readiness on one of the core ends to be connected and after the conductor connector has been applied, may be pushed over the connection area into a position in which it extends from core insulation to core insulation being seated thereon in sealed relationship. Such prefabricated elastomeric bodies may include an electrically conductive cylindrical lining and an external conductive coating, so that the lining will form an equipotential area in contact with the connector, and the conductive coating may be connected to the protecting layers of the two core ends as disclosed in U.S. Pat. No. 3,485,935. When using these known core connections for making the overall cable connection of multi-core cables, at least one core end must be so long that the elastomeric body may be pushed therealong into a position in which the spreading apart of the core ends as much as necessary and the fitting of the conductor connectors are not obstructed. In most applications the space required for this is not available in the longitudinal direction of the cable, because medium voltage multi-core cables are mainly used as buried cables for 12 to 20 kV 3-phase current power supply mains, for example in densely populated areas. It has, therefore, been necessary in this principal field of application to use the above-described tape wrapping technique, although this is particularly difficult, particularly in restricted spaces.

DISCLOSURE OF INVENTION

The present invention is based upon the problem of providing a compact multi-core cable connection which may be made conveniently and quickly in restricted spaces in a reliable manner and which for its application requires less skill than the wrapping technique.

This problem is solved in accordance with the invention with the aid of a multi-core cable connection in which the stress control comprises two prefabricated permanently elastic stress control elements, each one of them comprising a main body of permanently elastic insulating material, which extends a certain distance on a core insulation and terminates there with a gradually decreasing diameter, and towards the other end thereof extends a certain distance over the associated conductor connector and terminates there with a gradually decreasing diameter. Each main body has a permanently elastic, conductive, sleeve-like insert in it bridging the core insulation and the conductor connector and extending out of the main body on the conductor connector.

With the multi-core cable connection according to the invention the prefabricated permanently elastic stress control elements have relatively short dimensions longitudinally, because they respectively extend on one core end only from the insulation to the conductor connector. As the stress control elements taper towards their ends adjacent the cable, they may be separately pushed onto the exposed core ends in a relatively closely packed arrangement, without obstructing each other. The increase in diameter of each stress control element from the end adjacent the cable is effective to provide for the necessary spreading of the equipotential lines and thus serves for the stress control.

In the multi-core cable connection of the present invention, the two stress control elements are shorter than half the length of the overall finished core connection. The ends of the two stress control elements disposed on the conductor connector are bridged with filling material. As this filling material is disposed only in the center area of the core connection but not in the end areas which are of particularly difficult access, the fitting thereof does not cause any difficulties. The filling material may be provided in the form of a wrapping using high-voltage insulation tape but a filling material consisting of a curable compound may also be used.

The ends of the stress control elements over the conductor connector terminate with a gradually decreasing outer diameter so that the stress control elements are not forced apart during application of the filling material. The possibility of undesired displacement of the stress control elements may be further reduced by selecting the decrease of the outer diameter of the stress control elements such that the filling material in the annular space formed between the two stress control elements will exert a stronger effective contact pressure radially than tangentially.

The permanently elastic conductive sleeves of the stress control elements contact each other on the connector so as to leave no gap and their opposite ends overlap the core insulation to shape the electrical field and eliminate stress concentration within the sleeves. It is preferable that the adjacent ends of the conductive sleeves overlap so that when the filling material is applied, the ends of the sleeves will be firmly pressed circumferentially together by the pressure normally applied in this operation (for example when wrapping with a high-voltage insulation tape). This improves both the mechanical fixation and continuous contact-making with the conductor connector.

Normally, with multi-core cables for medium voltages the individual cores are provided with an outer conductive or low-resistance conductive layer. Connection between such cores is provided by low-resistance outer shielding contacting the outer conductive layer of the cores in order to provide a stress limitation radially through the entire connection area. The shielding is preferably provided by a jacket layer of permanently elastic conductive material. The shielding jacket may be applied in a very simple manner by providing it in a coiled-up condition, on one stress control element for example, and uncoiling it over the core connection after the mounting of the conductor connectors, positioning of the stress control elements and application of the filling material.

The multi-core cable connection may be readily made, in particular, when it is supplied in the form of a prefabricated set containing the required number of permanently elastic stress control elements and the additionally necessary parts such as the high-voltage insulation tape and outer shieldings of permanently elastic conductive material in a coiled-up condition.

The cable connection according to the invention offers particular advantages in connection with multi-core cables having cores of a sector-shaped cross sectional area. Moreover, when such cores are twisted, one stress control element is firmly seated on each core and at the tapered end thereof adjacent the connector will be able readily to adapt itself to possible irregularities of the connector which may occur with twisting of sector-shaped cores.

In each case, the field distribution in the critical filler or gusset areas is determined almost exclusively by the prefabricated permanently elastic stress control elements. Only in the center area of the core connections where the cores are spread apart widest and most space is available will manual work be required for the application of the filling material.

BRIEF DESCRIPTION OF DRAWINGS

The invention will now be described in more detail by way of examples of embodiments in connection with the drawing, wherein:

FIG. 1 shows a perspective view, partially sectioned, of a multi-core cable connection according to the invention;

FIG. 2 shows a partial longitudinal cross-sectional view for purposes of illustrating certain geometrical relationships for designing the connection; and FIG. 3 is a graph illustrating the geometrical relationships for designing the connection.

DETAILED DESCRIPTION

FIG. 1 shows a multi-core cable connection between two three-core medium voltage cables 1 and 3. The cable cores are electrically connected by similar connectors. For the sake of simplicity, there is only one core connection 5 shown in FIG. 1 between the cores 7 and 9. Each core has a conductor 11 and 13, respectively, a core insulation 15 and 17, respectively, surrounding it, and an outer conductive layer 19 and 21, respectively, surrounding the core insulation. With each cable the cores are surrounded by a concentric shielding; in FIG. 1, the shielding 25 is indicated only at the cable 1, folded back over the offset cable jacket 23.

Each core connection is surrounded by a stress control envelope 27 extending a distance at either end on the core insulation 15 and 17, respectively, in close contact with it. The stress control envelope 27 comprises two prefabricated permanently elastic stress control elements 29 and 31. Each stress control element comprises a sleeve-like main body 33 and 35, respectively, of permanently-elastic material, for example a silicone-rubber.

Each sleeve-like main body 33 or 35 of the stress control elements at the end thereof which will extend along and contact a core insulation 15 and 17, respectively, terminates with a gradually decreasing outer diameter. The body has a sufficient length so that it can bridge the core insulation and a conductor connector 37 which electrically connects the two conductors 11 and 13 with each other in the well known manner. The term "connector" as used herein is meant to comprise any type of electrical connection between the conductors of the cores; this thus may also involve welded or soldered connections or the like. The ends of the two stress control elements 29 and 31 disposed on the conductor connector 37 are bridged with electrically insulating filling material 39. In the illustrated embodiment the electrically insulating filling material is a permanently elastic filling material that has been applied by molding and curing a plastic compound. The filling material may also be produced by wrapping around a high-voltage insulating tape.

The ends of the stress control element bodies 33 and 35 over the conductor connector 37 terminate with a decreasing outside diameter. Preferably the decrease of the outer diameter in the end portions of the stress control elements adjacent the connector is selected in such a manner that the filling material 39 in the annular space formed between the two stress control elements exerts a stronger contact pressure radially than tangentially. The stress control elements 29 and 31 are then prevented from becoming displaced upon the application of the filling material 39.

The stress control elements 29 and 31 have sleeve-like inserts 41 and 43, respectively, of permanently elastic conductive material around which the main bodies 33 and 35, respectively, are molded so as to leave no gaps. The inserts 41 and 43 slightly project from the ends of the stress control elements 29 and 31, respectively, adjacent the connector so as to be able to bridge across the core insulations 15 and 17 and the connector 37 and preferably contact each other to cover the connector completely. It is, in fact, preferable that the stress control elements be pushed together so that the ends of the inserts overlap each other.

Each of the core connections has an electrically conductive outer shielding 45 contacting the outer conductive layer 19, 21 of the cores 7 and 9, respectively, which, in the case of the embodiment shown consists of a jacket of permanently elastic conductive material. In the embodiment shown in FIG. 1 the jacket forming the outer shielding 45 has been kept in readiness on the end of core 9 in a coiled-up condition, and FIG. 1 shows the jacket in a partly uncoiled condition.

The insulation of the cable splice will now be described. First, the cable jackets 23 and the metallic shielding 25 are offset through a certain distance at either end of the cable. From the thus exposed core ends the outer conductive layers 19, 21 and the core insulations 15, 17 are respectively removed so far that the conductors may be electrically connected by means of the connector 37. A stress control element 29 and 31 is pushed onto each core end. As the stress control elements are shorter in length than the overall length of the core connection (in the example of embodiment shown less than half the length of the splice opening) a relatively short push-on distance 47 and 49, respectively, will suffice to get the ends of the conductors 11 and 13, respectively, exposed. Thereupon the exposed ends of the conductors 11 and 13, respectively, will be electrically connected with each other by means of the connector 37. Thereafter the stress control elements 29 and 31 are displaced from the pushed-on positions of readiness into the end positions shown in FIG. 1, in which position their ends adjacent the connector are lying on the conductor connector 37. Thereupon the filling material 39 is applied, for instance, by wrapping with high-voltage insulation tape. Finally, the electrically conductive outer shielding 45 is uncoiled until it comes to lie onto the ends of the outer conductive layers 19 and 21, respectively. Due to its permanent elasticity, the outer shielding 45 comes to lie closely in sealing relationship both against the conductive layers 19, 21 and the exposed portions of the core insulations 15 and 17, so that an additional sealing envelope is no longer necessary for the core connections.

After all three cores of the two cables have been connected in the manner described and the shieldings have been conductively connected as usual, a protective jacket (not shown) is applied in a known manner. The ends of the protection jacket are sealingly seated on the cable jackets 23.

It will be noted from the above description of FIG. 1 that in the particularly difficult end portions of the cable connection where the exposed core end portions are beginning, that the stress control through the prefabricated stress control elements is made effective. Only in the center portions of the core connections where the cores are spread apart most and the greatest amount of space is available will it still be necessary to use some manual work for the application of the filling material 39. In the important end areas of the core connections adjacent the cable, the stress control effect is exactly determined by the prefabricated stress control elements 29, 31 in the manner as desired.

It will furthermore be seen from FIG. 1 that the sleeve-like inserts 41 and 43 of conductive material bridge the gaps between the connector 37 and the adjacent ends of the core insulations 15 and 17 so that these gaps cannot cause any disturbing inhomogeneities of the electric field in the insulating material. It is not necessary to pencil the ends of the core insulations; one only needs to cut off these ends radially.

The function according to which the outer diameter of the stress control elements decreases in the end portions thereof adjacent the cable is essentially governed by the desired effect of the stress control. In the case of the end portions adjacent the connector the diameter decrease is essentially governed by the components of the electrical field strength permitted there (often also called the "tangential field strength") along the boundary area between the stress control element and the filling material 39.

FIG. 2 illustrates the above in a simplified manner using the same reference numerals as in FIG. 1, however, with the cardinal number 2 placed in front. What is shown is a portion of the permanently elastic stress control element 231 which corresponds to the stress control element 31 of FIG. 1. Again, an inner sleeve-like lining 243 bridges the gap 253 between the core insulation 217 and the connector 237 which is connected to the conductor 213, forming with it an electrode of the same potential. The outer boundary area 255 at the end of the stress control element 231 adjacent the connector is formed in such a manner that both the radial field strength in the stress control element 231 and the filling material 239 adjacent thereto and the field vectors in the boundary area 255 are below desired limit values. In FIG. 2, Y denotes the radius of the stress control element 231 at point X measured from the axis 257, with X denoting a local coordinate extending in the direction of the axis 257, measured from the end 259 of the portion of the main body 235 of the stress control element 231 shown with the full diameter $R_a$ adjacent the cable. The shape of the end of a stress control element adjacent the connector may be determined with the aid of the relation between the axial coordinate X and the radial coordinate Y according to the formula $$X = \frac{U_o}{E_L} \ln \left[ \frac{\ln\left[\frac{R_a}{R_i}\right]}{\ln\left[\frac{Y}{R_i}\right]} \right]$$

wherein ln is the natural logarithm.

In the above formula $U_O$ is the operating voltage between the conductor 213 and the outer conductor layer 267, and $E_L$ is the permissible peak value of the axial field strength of the surface of the end portion 261 of reduced diameter of the main body 235 adjacent the connector. In FIG. 2 the component of this axial field strength tangentially of the interface 255 (the so-called tangential field strength) is indicated by an arrow 263.

The mentioned peak value $E_L$ should not normally be higher than about 1000 V/mm, preferably not higher than 300 V/mm.

FIG. 2 also shows most clearly that the end of the conductive lining 243 adjacent the cable preferably has a rounded edge 265. Thereby, the maximum values of the electric load of the main body 235 occurring there are reduced to desired values, especially according to the well-known "$\pi$—Borda Profile".

In the embodiment of FIG. 2 the stress control element 231 includes a jacket layer 267 of permanently elastic conductive material attached to the outside of the main body 235. The jacket layer 267 does not extend over the tapered end portion 261 adjacent the connector.

FIG. 3 shows in a graphical representation which is a mirror image of the stress control element of FIG. 2, the outer diameter (radial coordinate) Y calculated according to the above formula in the end portion 261 of the main body 235 of FIG. 2 adjacent a connector with $R_a=19$ mm and $R_i=11.5$ mm (thickness of lining 243=1.5 mm) for a 3-phase ground cable having a nominal voltage rating of 12 to 20 kV and a maximum tangential field strength (vector 263 of FIG. 2) of 300 V/mm. It will be noted that the outer diameter Y thus resulting will also have the desired result that the forces occurring with the application of the filling material (see 239 in FIG. 2) on the end portion 261 (FIG. 2) of the main body 235 (FIG. 2) have more radial than axial components and thus will secure the respective stress control element against undesired axial displacements upon application of the filler.

"Conductive material" as used in the above description for permanently elastic materials which may be used for the outer shielding 45 and the inner lining 41, 43 is meant to denote such materials as have an electric conductivity sufficient for the above-described purposes. Such materials are known per se. They may involve, in particular, elastomeric compositions blended with carbon black or other conductive fillers, having specific conductivities of more than about $10^{-4}$ S/cm. They may be employed wherever a charge and voltage balance at minimum current flow is the only object, i.e. also as outer conductive layers 19, 21, for example, for the cores 7 and 9 (FIG. 1).

We claim:

1. A multi-core cable connection for medium voltage cables, comprising:
    a conductor connector providing a core connection for each cable core, and
    a stress control envelope surrounding each core connection and extending a distance along the core insulation and lying in close contact with it, each stress control envelope including
        two prefabricated permanently elastic stress control elements, each of the stress control elements comprising
            a sleeve-like main body of permanently elastic insulating material which extends a distance on the core insulation and terminates there with a gradually decreasing diameter and towards its end adjacent the conductor connector extends a distance over the conductor connector and terminates there with a gradually decreasing diameter, and
            a permanently elastic, conductive, sleeve-like insert in the main body and bridging the core insulation and the conductor connector; and
    an electrically insulating filling material bridging the ends of the stress control elements on the conductor connector.

2. The multi-core cable connection of claim 1 wherein the conductive inserts of the two stress control elements of each said stress control envelope contact each other on the conductor connector.

3. The multi-core cable connection of claim 1 wherein the decrease of the outer diameter of the stress control elements (29, 31) at the end thereof over the conductor connector is selected to be such that the filling material (39) in the annular space formed between two stress control elements exerts a stronger radially than tangentially effective contact pressure.

4. The multi-core cable connection of claim 3 wherein the filling material (39) comprises a wrapping formed of high-voltage insulation tape.

5. The multi-core cable connection of claim 3 wherein the filling material (39) is a curable insulating material.

6. The multi-core cable connection of claim 1 wherein the conductive inserts on a conductor connector overlap each other.

7. The multi-core cable connection of claim 1 or 6 wherein the ends of the conductive inserts (243) extending on the core insulation are provided with rounded edges (265).

8. The multi-core cable connection of claim 1, 2 or 6 for multi-core cables of which the cores have an outer conductive layer wherein each stress control envelope (27) includes an outer jacket of permanently elastic, electrically conductive material (45) contacting the conductive layer (19, 21) of the cores (7, 9).

* * * * *